Patented July 9, 1940

2,207,627

UNITED STATES PATENT OFFICE 2,207,627

PROCESS FOR THE MANUFACTURE OF AMMONIUM DITHIOCARBAMATE

Roger A. Mathes, Akron, Ohio, assignor to The B. F. Goodrich Company, New York, N. Y., a corporation of New York No Drawing. Application December 3, 1938, Serial No. 243,813

8 Claims. (Cl. 260—500)

This invention relates to an improved process for the manufacture of ammonium dithiocarbamate. The objects of this invention are the manufacture of ammonium dithiocarbamate of high purity, in yields which approach the theoretical and at an economical cost.

I have found that the reaction between carbon disulfide and ammonia cannot be carried out satisfactorily except in the presence of diluents, but that conventional solvents such as water, alcohols, simple ethers, hydrocarbons, organic halides, and the like, are unsuitable for this purpose, since the chemicals either do not react or undergo undesired reactions forming ammonium thiocyanate, ammonium sulfide and other unwanted materials. In my Patents 2,117,619 and 2,123,370 to 2,123,373 I have described the manufacture of a pure ammonium dithiocarbamate by passing gaseous ammonia into carbon disulfide dissolved in certain specific diluents, including esters, higher ketones, aromatic nitro compounds, nitriles, and certain glycol ethers such as dioxane and glycol diethyl ether.

I have discovered that the yields and purity of ammonium dithiocarbamate are particularly high when the manufacture is carried out continuously. I have also discovered that aliphatic nitro hydrocarbons—meaning aliphatic hydrocarbons, either saturated, olefinic or cycloaliphatic, substituted only by a single nitro group—give unusually good results as diluents, although any of the other diluents disclosed in my above-mentioned patents may be substituted.

The continuous manufacture of ammonium dithiocarbamate may be carried out in various ways, depending on the nature of the diluent employed and the form in which the product is desired. In one modification of the process, gaseous ammonia is passed into a solution of carbon disulfide in a suitable diluent, the sludge of ammonium dithiocarbamate crystals is withdrawn from the bottom of the reaction vessel, the crystals are mechanically separated from the liquid which is mixed with fresh carbon disulfide and recirculated. In this modification the crystals of product may be removed by continuous filtration in any suitable filter such as a drum filter or centrifugal filter, or by any equivalent means. If the diluent is not readily volatile, it may be advisable to wash the crystals with a volatile solvent, the wash liquor preferably being segregated from the filtrate to avoid contamination of the reaction medium. If the crystals are washed with carbon disulfide, they will dry very rapidly, and the wash liquor can be mixed with the filtrate and serve as the supply of carbon disulfide to replace that used up in the reaction. In another modification of the process, the sludge of crystals is withdrawn to a separate vessel, mixed with water which dissolves the product, and the diluent separated from the water is recirculated. In this modification the product is secured as an aqueous solution, which is desirable, since solid ammonium dithiocarbamate is unstable. The diluent should be as insoluble in water as possible, and should be dried, as by passing through or over a drying medium which does not appreciably react with the particular diluent used, before being mixed with make-up carbon disulfide and returned to the reaction vessel.

The reaction is preferably carried out at a temperature between 15 and 35° C., although higher or lower temperatures may be employed if desired. The reaction is exothermal, hence the reaction vessel should be equipped with a cooling device such as a cooling jacket or cooling coils. A superatmospheric pressure may be employed if desired, but is not necessary.

The aliphatic nitro hydrocarbons which constitute a preferred class of diluents for this reaction, include among others, nitromethane, nitroethane, 1-nitropropane, 1-nitro n-butane, nitroisobutane, nitro octane, isonitropropane, secondary nitrobutane, nitroisohexylene, nitroisobutylene, nitropropylene, nitro octylene, nitrocyclohexane, nitrodecahydronaphthalene, etc.

These aliphatic nitro hydrocarbons may also be employed with excellent results in a batch process, in which case approximately one molecular proportion of carbon disulfide is dissolved in the diluting nitro compound. Approximately two molecular proportions of ammonia are passed in, with agitation. After a short period of ammonia addition, ammonium dithiocarbamate crystallizes out, being only sparingly soluble in aliphatic compounds. When the required amount of ammonia has been added, agitation is preferably continued for a short time, and ammonium dithiocarbamate is then filtered off. The product is air dried to remove the diluent. If higher boiling nitro compounds are employed, a wash with an inert, volatile solvent is desirable.

A modification in this procedure may be adopted when a water solution of ammonium dithiocarbamate is desired. Water is added to the suspension of ammonium dithiocarbamate in the diluting nitro compound of low water solubility, the product is readily dissolved and its water solution separated from the diluent. An advantage of this alternative method is the fact a water solution of ammonium dithiocarbamate is more stable than the dry powder.

When the continuous process is employed, the diluent is added to the reactor together with an amount of carbon disulfide sufficient to start the reaction. When ammonia is passed in, ammonium dithiocarbamate crystallizes out. The suspension consisting of ammonium dithiocarbamate and the diluent is continuously discharged from the reaction chamber, passing to any filtering device, such as a centrifugal. The clear filtrate is continuously returned to the reactor. An excess of carbon disulfide is maintained, the amount added being regulated by the weight of ammonia passed into the reaction mixture. Ammonium dithiocarbamate may be dried as obtained from the filter, preferably with provision for solvent recovery.

*Example 1*

Ammonia is bubbled continuously into a 10% solution of carbon disulfide in nitromethane. The slurry of ammonium dithiocarbamate crystals which forms is withdrawn at the bottom of the reaction vessel and filtered through a continuous centrifugal filter. The filtrate is mixed with a little fresh nitromethane to replace that adhering to the product and carbon disulfide equivalent to half the molecular proportion of ammonia being introduced, and is continuously returned to the reaction vessel. The product is air dried to remove the last traces of nitromethane. The nitromethane may be replaced by any other volatile aliphatic nitro compound or by volatile diluents of the types set forth in my patents referred to above.

*Example 2*

Ammonia is bubbled continuously into a 10% solution of carbon disulfide in nitrobutane. The slurry of ammonium dithiocarbamate crystals which forms is withdrawn at the bottom of the reaction vessel and filtered through a continuous drum filter arranged for washing on the drum and for mixing of the wash liquor with the filtrate, and the crystals are washed on the drum with carbon disulfide in a quantity slightly exceeding that equivalent to half the molecular proportion of ammonia being introduced. The filtrate containing the wash liquors is continuously returned to the reaction vessel. The product discharged from the filter dries almost instantaneously. The nitrobutane may be replaced by any other aliphatic nitro compound or other diluent of the types set forth in my patents referred to above.

*Example 3*

The process of Example 2 is modified in that the slurry instead of being filtered is continuously mixed with water and passed through a continuous decanter which separates as the final product a water solution of ammonium dithiocarbamate. The diluent leaving the decanter is dried by being mixed with 40% sodium hydroxide solution and separated therefrom in a second decanter, whereupon make-up carbon disulfide is added and the mixture is returned to the reaction vessel.

*Example 4*

42 g. of carbon disulfide are dissolved in 350 cc. of nitroethane in a reaction flask. Over a period of one hour, 17 g. of ammonia are passed in, with agitation. After a few minutes of ammonia addition, light yellow crystals of ammonium dithiocarbamate start to precipitate. The temperature is maintained at 15°–20° C. during the course of the reaction.

After all the ammonia has been added, the thick reaction mixture is allowed to agitate ten minutes, then filtered and washed with hexane. The dry weight is 51.2, representing a 93.1% yield.

From the data herein presented, the fact will be readily apparent that this invention constitutes a distinct improvement over previous processes for preparing ammonium dithiocarbamate.

I claim:

1. A process for the manufacture of ammonium dithiocarbamate which comprises continuously introducing carbon disulfide and ammonia into a liquid, aliphatic nitro hydrocarbon and continuously removing ammonium dithiocarbamate.

2. A process for the manufacture of ammonium dithiocarbamate which comprises interacting substantially two molecular proportions of ammonia with substantially one molecular proportion of carbon disulfide in the presence of a liquid, aliphatic nitro hydrocarbon.

3. A process for the manufacture of ammonium dithiocarbamate which comprises interacting ammonia and carbon disulfide in the presence of nitro-ethane.

4. A process for the manufacture of ammonium dithiocarbamate which comprises continuously introducing carbon disulfide and ammonia into nitroethane and continuously removing ammonium dithiocarbamate.

5. A process for the manufacture of ammonium dithiocarbamate which comprises interacting ammonia and carbon disulfide in the presence of nitrobutane.

6. A process for the manufacture of ammonium dithiocarbamate which comprises continuously introducing ammonia into a solution of carbon disulfide in nitrobutane, continuously filtering solid ammonium dithiocarbamate therefrom, washing the solid with carbon disulfide, and returning the filtrate and wash liquor to the reaction zone.

7. A process for the manufacture of ammonium dithiocarbamate which comprises continuously introducing carbon disulfide and ammonia into nitrobutane continuously extracting ammonium dithiocarbamate therefrom with water, and returning the extracted nitrobutane to the reaction zone.

8. A process for the manufacture of ammonium dithiocarbamate which comprises continuously introducing ammonia into a solution of carbon disulfide in a liquid aliphatic nitro hydrocarbon, continuously filtering solid ammonium dithiocarbamate therefrom, washing the solid with carbon disulfide, and returning the filtrate and wash liquor to the reaction zone.

ROGER A. MATHES.